United States Patent
Chiu et al.

(10) Patent No.: US 9,098,439 B2
(45) Date of Patent: Aug. 4, 2015

(54) PROVIDING A FAULT TOLERANT SYSTEM IN A LOOSELY-COUPLED CLUSTER ENVIRONMENT USING APPLICATION CHECKPOINTS AND LOGS

(75) Inventors: Lawrence Y. Chiu, Saratoga, CA (US); Shan Fan, Shanghi (CN); Yang Liu, Shanghai (CN); Mei Mei, Shanghai (CN); Paul H. Muench, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 13/344,313

(22) Filed: Jan. 5, 2012

(65) Prior Publication Data

US 2013/0179729 A1    Jul. 11, 2013

(51) Int. Cl.
*G06F 11/20* (2006.01)
*G06F 11/14* (2006.01)
*G06F 12/16* (2006.01)
*G06F 17/30* (2006.01)

(52) U.S. Cl.
CPC ............ *G06F 11/14* (2013.01); *G06F 11/1469* (2013.01); *G06F 11/2035* (2013.01); *G06F 11/2043* (2013.01); *G06F 11/2097* (2013.01); *G06F 12/16* (2013.01); *G06F 17/30* (2013.01)

(58) Field of Classification Search
CPC ............ G06F 11/1471; G06F 11/1448; G06F 11/1451; G06F 11/1469; G06F 11/2041; G06F 11/2064
USPC ........................................................ 714/15
See application file for complete search history.

(56) References Cited

U.S. PATENT DOCUMENTS

| | | | |
|---|---|---|---|
| 5,923,832 A | 7/1999 | Shirakihara et al. | |
| 7,167,880 B2 * | 1/2007 | Amano et al. | 1/1 |
| 7,328,226 B1 * | 2/2008 | Karr et al. | 1/1 |
| 7,437,594 B1 * | 10/2008 | Mount et al. | 714/4.11 |
| 7,523,345 B2 | 4/2009 | Schroiff et al. | |
| 7,689,862 B1 | 3/2010 | Bharthulwar et al. | |

(Continued)

FOREIGN PATENT DOCUMENTS

| | | |
|---|---|---|
| JP | 4291628 A | 10/1992 |
| JP | 2008-052407 | 3/2008 |
| JP | 2008-191705 A | 8/2008 |

OTHER PUBLICATIONS

Wikipedia's Microsoft Exchange Server version from Jan. 4, 2012 http://en.wikipedia.org/w/index.php?title=Microsoft_Exchange_Server&oldid=469465617.*

(Continued)

*Primary Examiner* — Joseph Schell
(74) *Attorney, Agent, or Firm* — Kunzler Law Group

(57) ABSTRACT

An approach to providing failure protection in a loosely-coupled cluster environment. A node in the cluster generates checkpoints of application data in a consistent state for an application that is running on a first node in the cluster. The node sends the checkpoint to one or more of the other nodes in the cluster. The node may also generate log entries of changes in the application data that occur between checkpoints of the application data. The node may send the log entries to other nodes in the cluster. The node may similarly receive external checkpoints and external log entries from other nodes in the cluster. In response to a node failure, the node may start an application on the failed node and recover the application using the external checkpoints and external log entries for the application.

20 Claims, 6 Drawing Sheets

(56) References Cited

U.S. PATENT DOCUMENTS

| | | | |
|---|---|---|---|
| 7,769,722 B1* | 8/2010 | Bergant et al. | 707/681 |
| 8,341,363 B2* | 12/2012 | Chou et al. | 711/162 |
| 8,516,021 B2* | 8/2013 | Aronovich et al. | 707/826 |
| 2005/0234919 A1 | 10/2005 | Maya et al. | |
| 2007/0168692 A1* | 7/2007 | Quintiliano | 714/4 |
| 2007/0168711 A1* | 7/2007 | Chen | 714/11 |
| 2007/0233870 A1 | 10/2007 | Goto et al. | |
| 2008/0033910 A1* | 2/2008 | Richards et al. | 707/2 |
| 2008/0033964 A1* | 2/2008 | Richards et al. | 707/10 |
| 2008/0307258 A1* | 12/2008 | Challenger et al. | 714/20 |
| 2011/0041006 A1* | 2/2011 | Fowler | 714/10 |
| 2011/0078123 A1 | 3/2011 | Busch et al. | |

OTHER PUBLICATIONS

PCT/IB2012/057236 International Search Report and Written Opinion, Feb. 19, 2013.

* cited by examiner

PROVIDING A FAULT TOLERANT SYSTEM IN A LOOSELY-COUPLED CLUSTER ENVIRONMENT USING APPLICATION CHECKPOINTS AND LOGS

FIELD

The subject matter disclosed herein relates to approaches to recovering from node failures in loosely-coupled clusters.

BACKGROUND

A computer cluster generally refers to a group of linked computing devices that work together to perform various computational tasks. The computing devices in the cluster are often connected to each other through local area networks. In many situations, the computer cluster as a whole operates as if it were a single computer. By using multiple computing devices, a cluster can often provide high performance and high availability in a cost-effective manner. Indeed, many of the fastest computers are, in fact, clusters.

Many clusters use some form of shared memory or shared storage to support their operations. However, other varieties of clusters do not have shared memory. These clusters lacking shared memory are called loosely-coupled clusters. Lack of shared memory can make recovery from node failures in the loosely-coupled cluster difficult.

BRIEF SUMMARY

An approach to node failure recovery in a loosely-coupled cluster is disclosed. The summary that follows is for convenience, and is not a limitation on the claims.

The invention may be realized as a computer program product stored on a computer readable storage medium. The computer program product may comprise various instructions, including instructions for generating a checkpoint of application data that is in a consistent state on a first node in a loosely-coupled cluster that comprises a plurality of nodes separate from the first node. The application data is data of an application running on the first node. The computer program product may further comprise instructions for sending the checkpoint to one or more nodes of the plurality of nodes, and for generating one or more log entries of changes in the application data between checkpoints of the application data. The instructions may further cause sending the log entries to the one or more nodes.

The invention may also be realized as a system that includes a first event manager running on a first node in a loosely-coupled cluster that also comprises a second node separate from the first node. The first event manager may generate a checkpoint of application data that is in a consistent state on the first node, and may generate one or more log entries of changes in the application data between checkpoints of the application data. A first replicating service may send the checkpoint to a second node for storage in local storage of the second node, and send the log entries to the second node for storage in the local storage of the second node.

The system may also include a second event manager running on the second node in the loosely-coupled cluster. The second event manager may monitoring for failure of the first node and recover, on the second node, the first application from the checkpoint sent to the second node and from the log entries sent to the second node.

The invention may further be realized as a computer-implemented method that involves generating a checkpoint of application data that is in a consistent state on a first node in a loosely-coupled cluster comprising a plurality of nodes separate from the first node. The method may also involve sending the checkpoint to the one or more nodes of the plurality of nodes, wherein the checkpoint is saved in local storage of the one or more nodes. The method may further involve generating one or more log entries of changes in the application data between checkpoints of the application data and sending the log entries to the one or more nodes, wherein the log entries are saved in local storage of the one or more nodes.

The present invention may be realized in a variety of forms. The present invention may be realized as a computer program product, a system, a method, or other form. References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
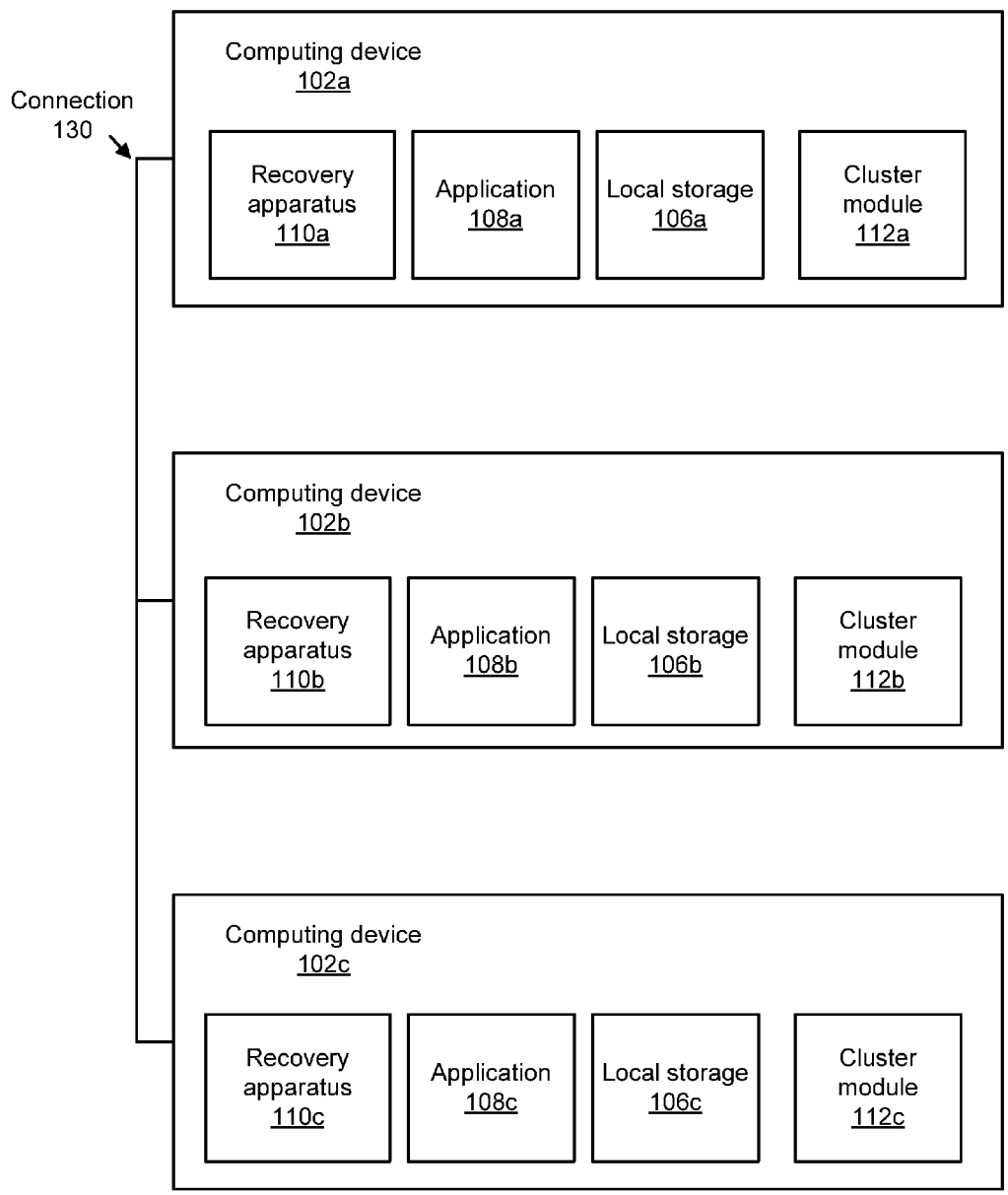
FIG. 1 is an illustrative block diagram showing one embodiment of a loosely-coupled cluster comprising connected computing devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in microcode, firmware, or the like of programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. The computer readable medium may be non-transitory.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-Ray Disc (BD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fibre cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fibre optic cable for execution by a processor and stored on RAM storage device for execution by the processor.

Computer readable program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer-readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer-readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 depicts one embodiment of a system 100 that includes a first computing device 102a, a second computing device 102b, and a third computing device 102c that are communicatively connected by the connection 130. The computing devices 102a-c in FIG. 1 are organized into a loosely-coupled cluster. As used herein, a loosely-coupled cluster refers to a cluster of one or more computing devices 102, which cluster lacks a shared memory and which lacks shared storage. The term "shared memory" is used in this application to refer to either a physical memory that is shared by the computing devices 102 in the cluster (physically shared storage), or distributed and physically separate memory that is addressed as one address space by computing device 102 in the cluster (logically shared), or some combination thereof.

The term computing devices 102 refers to physical devices that include processors and memory and that are capable of executing instructions. The computing devices 102 may be laptop computers, desktop computers, server devices (such as blade servers) video game consoles, or other suitable computing devices 102. The term node refers to a computing device 102 that is a member of a cluster.

Rather than have a shared memory, the computing devices 102a-c have local storage 106a-c. The term local storage 106 refers to storage that is used by a particular computing device 102, and that is not shared with the other computing devices 102 in the cluster. The local storage 106 may include physical storage media that is part of the computing device 102. The local storage 106 may also include a file system for accessing the physical media. The local storage 106 is not addressed as one address space for all computing devices 102 in the loosely-coupled cluster.

The computing devices 102a-c are communicatively connected by a connection 130. The connection 130 allows the computing devices 102a-c to share information and data. The connection 130 may be a local area network (LAN), wide area network (WAN), or other network. The connection 130 may use Ethernet, Fibre Channel, or other suitable communications technologies.

The computing devices 102a-c also include appropriate hardware for executing instructions, such as one or more processors, and may include additional components. The computing devices 102a-c may also include cluster modules 112a-c that cause the computing devices 102a-c to operate as a loosely-coupled cluster. The cluster modules 112a-c may configure the computing devices 102a-c to act as a single virtual machine. The cluster modules 112a-c may configure the computing devices 102a-c to provide load balancing and to distribute requests initiated by a user among the computing devices 102a-c.

The computing devices 102a-c may also run applications 108a-c. The applications 108a-c are computer programs that run on the computing devices 102a-c and that access, create, and/or alter data in the local storage 106a-c. Each computing device 102a-c may run a different application 108a-c. Each computing device 102a-c may have the application software necessary to start and run multiple applications 108 at a given time. However, at a given time, the computing devices 102a-c may be running different applications 108a-c.

The computing devices 102a-c may also include recovery apparatus 110a-c. As explained further herein, the recovery apparatus 110a-c may be responsible for generating and sharing checkpoints and log entries for applications 108a-c running on the computing device 102a-c. In the event that a node (such as computing device 102a) in the cluster fails, the recovery apparatus 110a-c may be responsible for using the checkpoints and log entries to recover from the failure by having the applications 108 running on the failed node started on a separate node using the checkpoints and log entries for the applications 108 that were running on the failed node.

Figure 2:
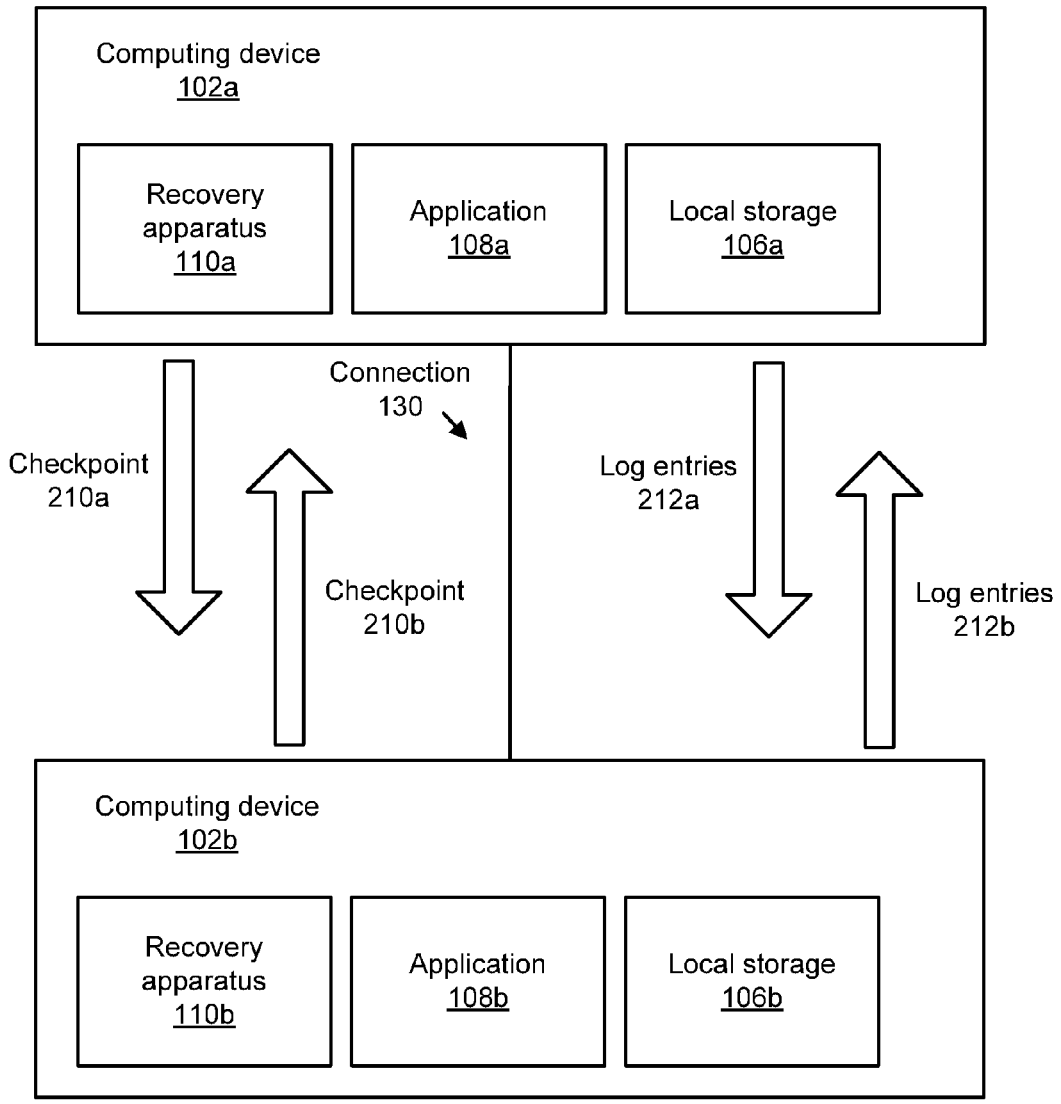
FIG. 2 is an illustrative block diagram showing one embodiment of a loosely-coupled cluster comprising connected computing devices sharing checkpoints and log entries.

FIG. 2 shows one embodiment of a system 200 that includes two computing devices 102a and 102b organized as a loosely-coupled cluster. The computing device 102a and 102b are connected by the connection 130.

The recovery apparatus 110a generates a checkpoint of application data that is in a consistent state on the computing device 102a, which is a node in the loosely-coupled cluster. The application data is data generated by the application 108a. The checkpoint is a collection of application data in a consistent state which the application 108a can use to recover in the event of a failure. The application data may include a snapshot of the application state. The application data may also include a snapshot of data for the application 108a stored in the local storage 106a.

The recovery apparatus 110a may send the checkpoint (designated checkpoint 210a in FIG. 2) to the computing device 102b. In one embodiment, the checkpoint 210a is sent to the recovery apparatus 110b. The recover apparatus 110b may receive the checkpoint 210a and cause the checkpoint 210a to be stored in the local storage 106b for the computing device 102b. In certain embodiments, the recovery apparatus 110a may send the checkpoint 210a to the computing device 102b as a background process. The recovery apparatus 110a may send the checkpoint 210a to the computing device 102b over the connection 130.

The recovery apparatus 110a may also generate log entries 212a of changes in the application data for the application 108a that occur between checkpoints 210 of the application data. For example, the recovery apparatus 110a may be configured to take a checkpoint 210a every two hours. The recovery apparatus 110a may create a log of log entries 212a of the changes in the application data during the two hour interval. The recovery apparatus 110a may also send the log entries 212a to the computing device 102b. The log entries 212a may be sent as part of a background process.

The recovery apparatus 110a may create log entries 212a by saving a sequence of records for the changes in the application data. In certain embodiments, each log entry is small and can be synched among all nodes in the cluster, as described below. The log entries 212a may be replayable by the application 108a, which allows the application data for the application 108a to be updated using the log entries 212a. The process of creating and managing log entries 212a may involve preparing the relevant environment for saving the log entries 212a and appending log entry 212 records to a log file.

The recovery apparatus 110a may be configured to delete the log entries 212a when a new checkpoint 210 is taken for the application 108a, which new checkpoint 210 accounts for the changes in application data represented by the log entries 212a. For example, a first checkpoint 210 may be taken at time t. After the first checkpoint 210 is taken, the recovery apparatus 110a may generate log entries 212a that represent the changes in the application data that occur after the first checkpoint 210 is taken. At a time t+l, the recovery apparatus 110a may take a second checkpoint 210. This second checkpoint 210 accounts for the changes in the application data that were recorded in the log entries 212a. The recovery apparatus 110a may delete the log entries 212a, and generate new log entries 212 that occur after the second checkpoint 210.

The recovery apparatus 110a may also be configured to receive an external checkpoint 210b from the computing device 102b. Checkpoints 210 received from another node in the cluster are referred to as external checkpoints 210. The external checkpoint 210b may include the application data for an application 108b running on the computing device 102b that is a node in the cluster. The recovery apparatus 110a may receive the checkpoint 210b and store the checkpoint 210b in the local storage 106a.

The recovery apparatus 110a may also receive external log entries 212b for the application 108b that were generated on the computing device 102b. The external log entries 212b may account for changes in the application data that are made after the checkpoint 210b is generated, and before another checkpoint 210 is generated by the recovery apparatus 110b. The recovery apparatus 110b may store the log entries 212b in local storage 106a.

While the above example shows only a single application 108a on the computing device 102a and a single application 108b on the computing device 102b, the computing devices 102a and 102b may have multiple applications 108. The respective computing devices 102a and 102b may generate checkpoints 210 and log entries 212 for each of the applications 108 that are running on the computing devices 102a and 102b.

The recovery apparatus 110 may be configured to monitor for node failures in the loosely-coupled cluster that result in a failed node. The recovery apparatus 110 may be further configured to determine, in response to detecting a node failure, that the node on which the recovery apparatus 110 runs is the failover node for the failed node. Node failure can encompass a range of failures, including hardware failure on the computing device 102b, and software failures.

For example, the recovery apparatus 110a may monitor for failure of the computing devices 102b. In certain embodiments, the cluster module 112a can determine whether the computing device 102b has failed. In such embodiments, monitoring for failure may involve receiving a message from the cluster module 112a that indicates that the computing device 102b has failed. In other embodiments, the recovery apparatus 110a may directly monitor the computing device 102b. For example, the recovery apparatus 110a may receive heartbeats from the recovery apparatus 110b and determine that the computing device 102b has failed if the recovery apparatus 110a does not receive a heartbeat for a specified period of time. Other approaches to monitoring for node failure can also be used.

The recovery apparatus 110a may determine that the computing device 102b has failed. The recovery apparatus 110a may further determine that it is the failover node for the computing device 102b. The recovery apparatus 110a may determine that the computing device 102a is the failover node for the computing device 102b based on user definitions of which nodes are to be failover nodes in the loosely-coupled cluster. In another embodiment, determining that the computing device 102a is the failover node for the computing device 102b may involve determining that the computing device has the necessary instructions to execute the application 108b. In certain embodiments, more than one computing device 102 in the loosely-coupled cluster may be the failover node for the computing device 102b; for example, one computing device 102 may be responsible for recovering a one application 108 that was running on the failed node, while another computing device 102 may be responsible for recovery another application 108 that was running on the failed node. In such an embodiment, both computing devices 102 are failover nodes for the failed node.

The recovery apparatus 110a may recover, on the computing device 102a, the application 108b on the failed computing device 102b from the checkpoint 210b received from the computing device 102b. The recovery apparatus 110a may initiate the application 108b on the computing device 102a as part of the recovery if the application 108b is not already running on the computing device 102a. The recovery apparatus 110a may also provide the application 108b with the checkpoint 210b such that the application 108b can recover to the state consistent with the application data in the checkpoint 210b.

In another embodiment, the application 108b may be running on the computing device 102a at the time of failure; however, the application 108b on the computing device 102a may be working with different application data than the application data of the application 108b instance running on the computing device 102b. In such an embodiment, the recovery apparatus 110a may cause the application 108b on the computing device 102a to take responsibility for the application data previously being managed on the computing device 102b. The recovery apparatus 100a may recover, on the computing device 102a, the instance of the application 108b on the failed computing device 102b from the checkpoint 210b received from the computing device 102b.

The recovery apparatus 110a may further recover the application 108b from the external log entries 212b received by the computing device 102a. In certain embodiments, the recovery apparatus 110a provides the log entries 212b to the application 108b after the application 108b has recovered to the state consistent with the application data in the checkpoint 210b. The application 108b may then recover to a state that occurred after the checkpoint 210b was taken by using the log entries 212b to make additional changes to the application data. As a result, the recovery apparatus 110a may allow the application 108b to recover to a point after the checkpoint 21b was taken.

The application 108b may thereafter run on the computing device 102a while the computing device 102b is a failed node. In certain embodiments, the recovery apparatus 110a continues to monitor the status of the computing device 102b. If the recovery apparatus 110a determines that the computing device 102b has recovered from the failure, the recovery apparatus 110a may cause the application 108b to failback to the computing device 102b. Failing the application 108b back to the computing device 102b may involve taking a checkpoint 210 for the application 108b running on the computing device 102a and sending the checkpoint 210 to the computing device 102b. The failback operation may also involve causing the application 108b to restart on the computing device 102b from the checkpoint 210b. The failback operation may further involve shutting down the application 108b on the computing device 102a in response to the application 108b on the computing device 102b starting.

While the above example discussed taking checkpoints 212 and log entries for a single application 108, checkpoints 212 and log entries 108 may be taken at a group level as well. In certain embodiments, checkpointing and logging may be done for consistency groups that include a plurality of applications 108. For example, a user may designate three applications to be in a consistency group. Checkpoints 210 may be generated for the entire consistency group. The checkpoints 210 may be generated when the application data for the applications 108 in the consistency group is consistent at a group level.

For example, a transaction may involve a first step by a first application 108 and a second step by a second application 108 in a consistency group. The application data for the first application 108 may be consistent after the first step is executed. The application data for the second application 108 may be consistent after the second step is executed. The recovery apparatus 110a may wait until the second step is executed before taking the checkpoint 210 for the consistency group in order to ensure that the data is consistent for all applications 108 in the consistency group at the time the checkpoint is taken.

Figure 3:
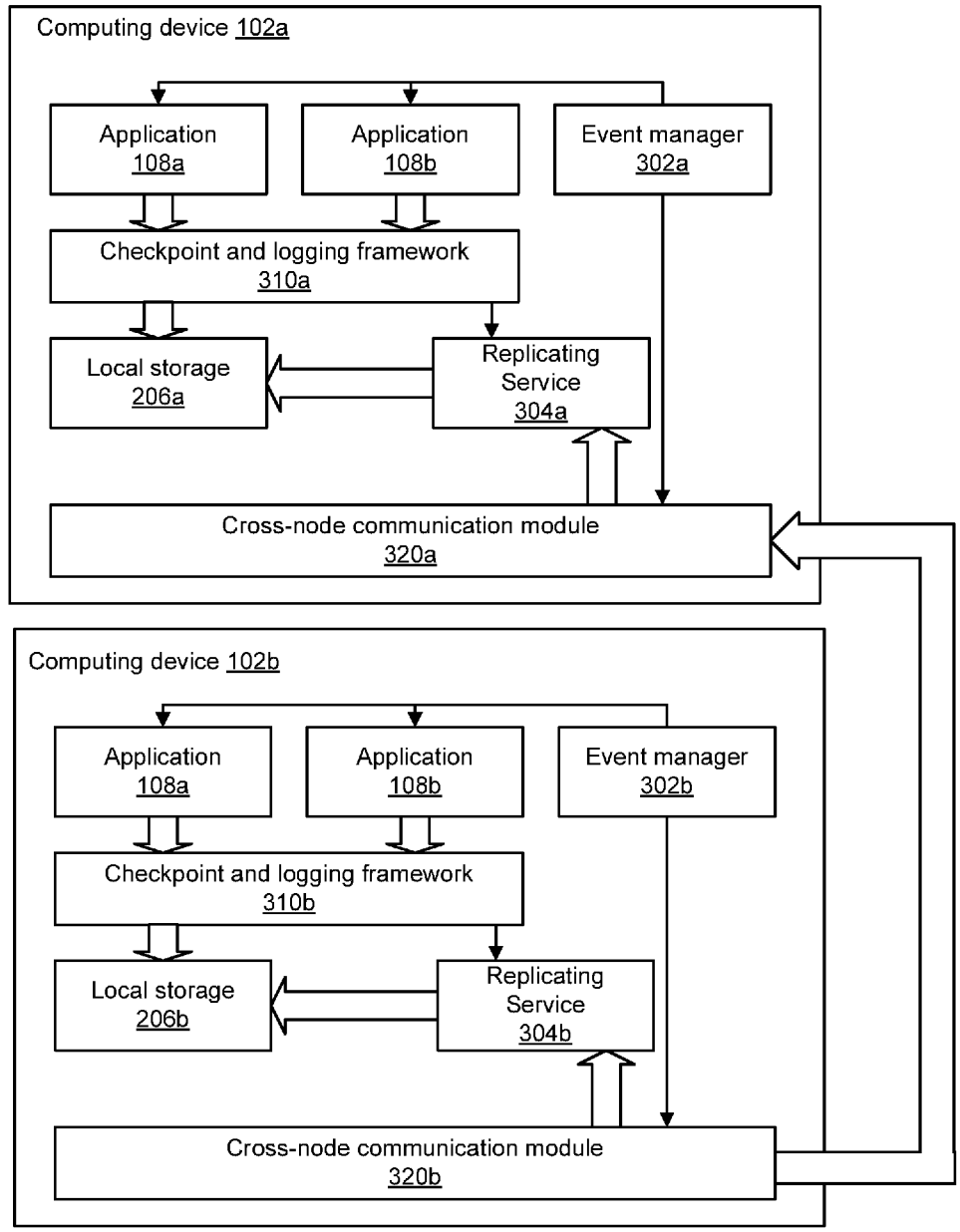
FIG. 3 is an illustrative block diagram showing one embodiment of a computing devices with one implementation of a recovery apparatus.

FIG. 3 shows one embodiment of a system 300 including a computing device 102a and a computing device 102b. The recovery apparatus 110a may be implemented on the computing device 102a as an event manager 302a, a checkpoint and logging framework 310a, replicating server 304a, and cross node communication 320a. The recovery apparatus 110b may be implemented on the computing device 102b as an event manager 302b, a checkpoint and logging framework 310b, replicating server 304b, and cross node communication 320b.

The event manager 302 is a component with which the applications 108, other components of the recovery apparatus 110a, and the cluster module 112 communicate. The event manager 302a may be registered to the cluster module 112 that facilitates operation of the cluster that includes the computing devices 102a and 102b as nodes. The event manager 302a may watch for cluster system events, cluster state transitions (e.g., node removals and node additions), and make data recovery decisions. The applications 108a-b on the computing device 102a may register with the event manager 302a.

The event manager 302 may trigger the taking of a checkpoint 210 for an application 108. The event manager 302 may trigger the taking of a checkpoint 210 for one or more applications 108 in the consistency group. The application 108 may take the checkpoint 210 itself using the checkpoint and logging framework 310. In certain embodiments, the applications 108 are responsible for generating log entries 212.

In the event of a node failure on computing device 102b, the event manager 302a may determine that the computing device 102b has failed. The event manager 302a may receive one or more messages from the cluster module 112 indicating that the computing device 102b has failed. The event manager 302a may be responsible for determining that the computing device 102a is the failover node for the computing device 102b, and to initiate data recovery procedures.

In certain embodiments, the event manager 302a may communicate with other event managers 302 (such as event manager 302b) in the cluster. The event manager 302a may determine whether the checkpoint 210 in local storage 206a for the computing device 102a is the most current checkpoint 210. In one embodiment, the event manager 302a requests a timestamp for the most current checkpoints 210 of the other event mangers 302 in the cluster. The event manager 302a may use the timestamp to determine which computing device 102a in the cluster has the most current checkpoint 210. Other approaches to determining which computing device 102a has the most current checkpoint 210 may also be used. The checkpoints 210 need not have an associated time stamp.

The event manager 302a may also determine which computing device 102a has the most current log entries 212. The event manger 302a may be responsible for tracking the data versions of the checkpoints 210 and the log entries 212. The event manager 302a may, for example, request timestamps for the latest log entry 212 in the local storage 206a of each computing device 102a in the node that is functioning. The event manager 302a may determine that the computing device 102 with the latest time stamp for log entries has the most current log entries 212. As above, other approaches to determining which computing device 102 has the most current log entries 212 may also be used.

The event manager 302a may designate the computing device 102a with the most current checkpoint 212 as the failover node for the failed node. The event manager 302a on the failover node may request the most current log entries 212 from other computing devices 102 in the cluster if other computing devices 102 have more current log entries 212. In other embodiments, a particular computing device 102 may be designated the failover node for the failed node even if the computing device 102 does not have the most current checkpoint 210 or the most current log entries 212. In such an embodiment, the event manager 302 on the failover node may request the most current checkpoint 210 from one or more running nodes in the cluster. The event manager 302 may similarly request the most current log entries 212 from one or more running nodes in the cluster.

The recovery apparatus 110a may also include a checkpoint and logging framework 310a. The checkpoint and logging framework 310a is a collection of software libraries providing an application programming interface (API) that applications 108 use to generate checkpoints 210 and log entries 212. The interface provided by the checkpoint and logging framework 310a may also allow applications 108 to recover using checkpoints 210 and log entries 212. In one embodiment, the application 108 invokes a method or function of the checkpoint and logging framework 310 to generate a checkpoint 210 and/or log entry 212. The application 108 may similarly invoke a method or function of the checkpoint and logging framework 310 to obtain the data stored in a checkpoint 210 and/or one or more log entries 212, allowing the application 108 to recover using the application data represented by the checkpoint 210 and/or log entries 212.

Implementing a checkpoint and logging framework 310a may make the benefits of checkpoints 210 and log entries 212 available to a wide range of applications 108 without requiring extensive new code in the applications 108. In certain embodiments, the applications 108 may gain this additional functionality through the insertion of method and/or function calls to the checkpoint and logging framework 310 in the existing code. The checkpoint and logging framework 310 may thus provide more general availability of checkpointing and logging in the cluster.

The recovery apparatus 110a may also include a replicating service 304a that transfers the checkpoints 210 and the log entries 212 to the nodes in the cluster. The replicating service 304a may transfer the checkpoints 210 and the log entries 212 to the computing device 102b as a background operation. The replicating service 304a may send the checkpoints 210 and the log entries 212 by broadcasting the checkpoints 210 and the log entries 212. The replicating service 304a may send the checkpoints 210 and the log entries 212 to only select nodes within the cluster.

The replicating service 304a may also be responsible for receiving checkpoints 210 from other nodes in the cluster and for saving the checkpoints 210 to local storage 206a. The replicating service 304a may further be responsible for receiving log entries 212 from other nodes in the cluster and saving the log entries 212 in the local storage 206a. The replicating service 304a may also notify the event manager 302a when a checkpoint 210 is received, and when a log entry 212 is received. The event manager 302a may use this information to provide software version control for the checkpoints 210 and the log entries 212 received by the computing device 102a and stored in the local storage 206a.

The cross-node communication module 320 provides communications between the nodes in the cluster. The cross-node communication module 320 may be part of the cluster module 112. The cross-node communication module 320 may allow the checkpoints 210 and log entries 212 to be passed from one node in the cluster to another.

FIG. 3 also shows one embodiment of how data may flow in the cluster. The data flow is represented by the open arrows. While FIG. 3 shows the data flowing in a particular direction, this is only one example of possible data flow. Data may flow in other directions between components, and may flow between other components than those shown.

FIG. 3 also shows one embodiment of control flow represented by the black line arrows. As with the data flow, the flow shown in FIG. 3 is simply one example of control flow, and the control flow may move in directions other than those shown, including opposite those shown.

Figure 4:
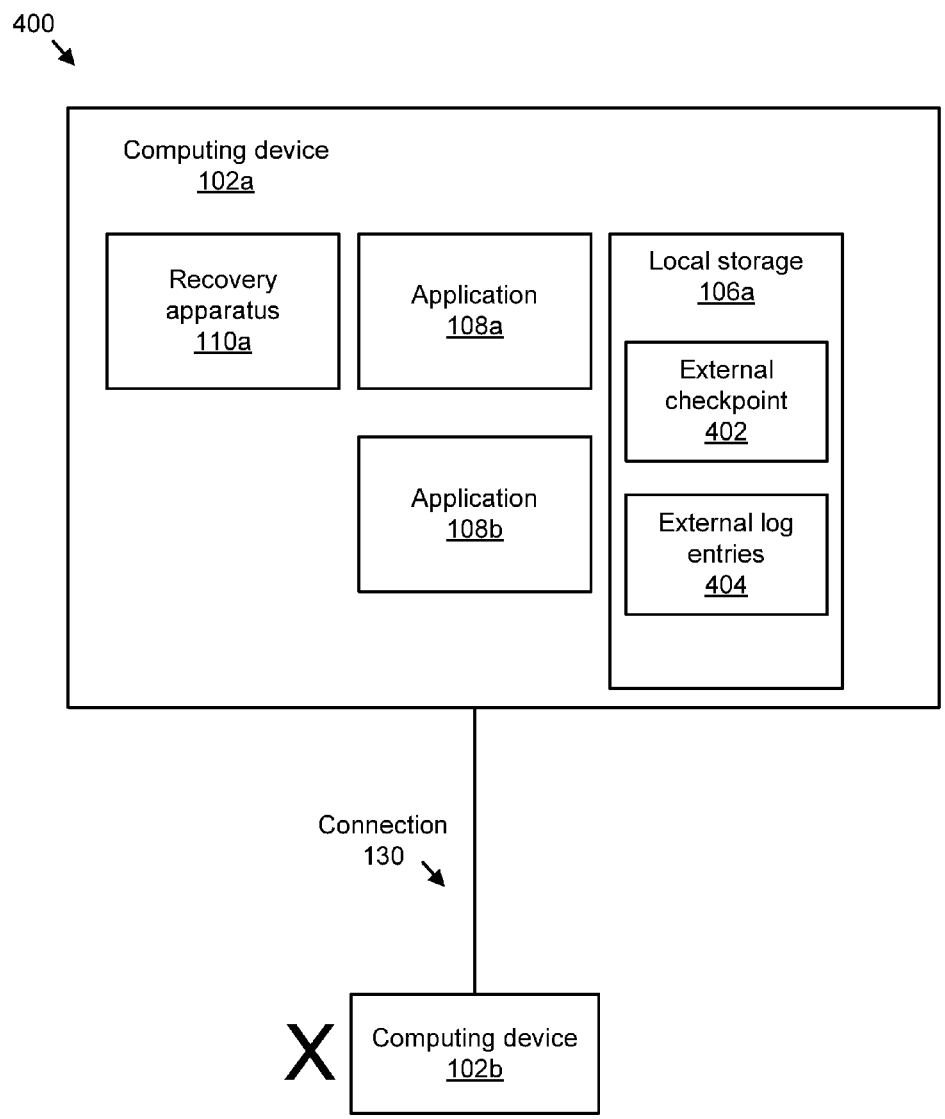
FIG. 4 is an illustrative block diagram showing one embodiment of recovery in a loosely-coupled cluster.

FIG. 4 shows one embodiment of a system 400 that is a loosely-coupled cluster that includes computing device 102a and computing device 102b as nodes. The computing device 102a includes a recovery apparatus 110a, applications 108a and 108b, and local storage 106a. The computing device 102b may include similar components.

At some point, the computing device 102b may become a failed node in the cluster, as represented by the "X" in FIG. 4. The recovery apparatus 110a may detect the node failure of the computing device 102b. In certain embodiments, the recovery apparatus 110a may determine that the computing device 102b has failed, and that the computing device 102a is the failover node for the computing device 102b. The recovery apparatus 110a may determine one or more applications 108 that were running on the computing device 102b that need to recover.

In one embodiment, the application 108a may have been running on the computing device 102a at the time of the node failure, and the application 108b may have been running on the computing device 102b at the time of the node failure. The recovery apparatus 110a may determine that the application 108b should be recovered on the computing device 102a. In one embodiment, the recovery apparatus 110a initiates the application 108b on the computing device 102a as part of the recovery process. The recovery apparatus 110a may further cause the application 108b to recover from the external checkpoint 402 for the application 108b that was received from another node in the cluster. The recovery apparatus 110a may further cause the application 108b to further recover from the external log entries 404 in the local storage 106a of the computing device 102a that were received from other nodes in the cluster. The application 108b may continue normal operations once it has recovered from the external checkpoint 402 and the external log entries 404.

In certain embodiments, the recovery apparatus 110a may continue to monitor the status of the computing device 102b. In one embodiment, the recovery apparatus 110a performs a failback operation in response to the computing device 102b recovering from the failure. A failback operation refers to the process of restarting the application 108b on the computing device 102b.

In one embodiment, the recovery apparatus 110a, after determining that the computing device 102b has recovered from the node failure, sends a checkpoint 210 for the application 108b to the computing device 102b. The recovery apparatus 110a may send a most current checkpoint 210 taken while the application 108b was executing on the computing device 102a after the computing device 102b failed to the computing device 102b. The recovery apparatus 110a may further send log entries 212 for the application 108b generated while the application 108b was executing on the computing device 102a after the failure of computing device 102b. The recovery apparatus 110a may then pass control to a recovery apparatus 110b operating on the computing device 102b.

In response, the recovery apparatus 110b on the computing device 102b may cause the application 108b executing on the computing device 102b to recover using the application data in the checkpoint 210 and the log entries 212 received from the recovery apparatus 110a. In one embodiment, the recovery apparatus 110b may report to the recovery apparatus 110a once the recovery process for the application 108b on the computing device 102b is complete. The recovery apparatus 110a may stop the application 108b in response to receiving the report from the recovery apparatus 110b.

Figure 5:
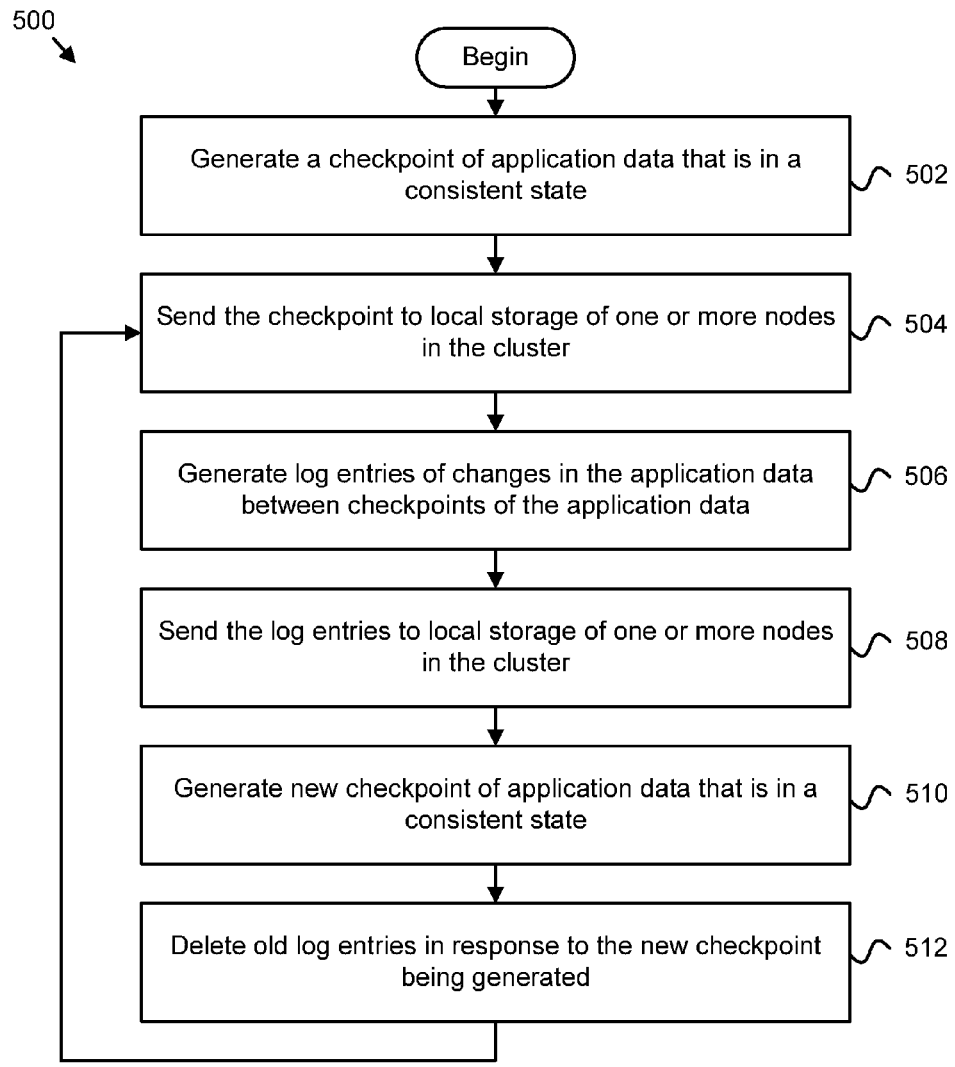
FIG. 5 is an illustrative flow chart diagram illustrating one embodiment of a method for generating checkpoints and log entries in a loosely-coupled cluster.

FIG. 5 shows one embodiment of a method 500 for generating checkpoint 210 and log entries 212. In one embodiment, the method 500 begins with generating 502 a checkpoint 210 of application data that is in a consistent state. The application data may be for a single application 108, or for a group of applications designated a consistency group, as discussed above. An application 108 may generate the checkpoint 210 by invoking a checkpoint and logging framework 310.

The method 500 may also involve sending 506 the checkpoint 210 for storage in the local storage 106 of one or more nodes in the cluster. In one embodiment, the checkpoint 201 is sent by a replicating service 304 to other recovery apparatus 110 implemented on the nodes in the cluster. The replicating service 304 may send the checkpoint 210 to the other nodes in the cluster as a background process. An event manager 302 on the nodes may be responsible for maintaining version control of the checkpoints 210.

The method 500 may also involve generating 506 log entries 212 of changes in the application data for the application 108 that occur between checkpoints 210 of the application data. In certain embodiments, log entries 212 are generated when the changed data represented by the log entry 212 is in a consistent state; for example, a transaction may involve three or more operations that change application data. The log entry 212 representing the transaction may only be generated when the transaction is committed.

The method 500 may also involve sending 506 the log entries 212 for storage in the local storage 106 of one or more nodes in the cluster. In one embodiment, the log entries 212 are sent by the replicating service 304 to other recovery apparatus 110 implemented on the nodes in the cluster. The replicating service 304 may send the log entries 212 to the other nodes in the cluster as a background process. An event manager 302 on the nodes may be responsible for maintaining version control of the log entries 212.

The method 500 may further involve generating 510 a new checkpoint 210 of the application data that is in a consistent state. The recovery apparatus 110 may be configured to cause applications 108 to take checkpoints 210 at certain times. In other embodiments, the applications 108 may determine when to generate the checkpoints 210. In other embodiments, a new checkpoint 210 is generated in response to a log of log entries 212 reaching a certain size.

The method 500 may also involve deleting 512 the old log entries 212 whose changes are accounted for in the new checkpoint 210 in response to the new checkpoint 210 being generated. In other embodiments, the log entries 210 are archived for the cluster. Deleting the log entries 212 may involve physically erasing the log entries 212 from the storage media in the local storage 106, or simply designating the addresses that store the log entries 212 as free space. The method 500 may continue with sending the new checkpoint 210, and repeating the process as shown in FIG. 5.

Figure 6:
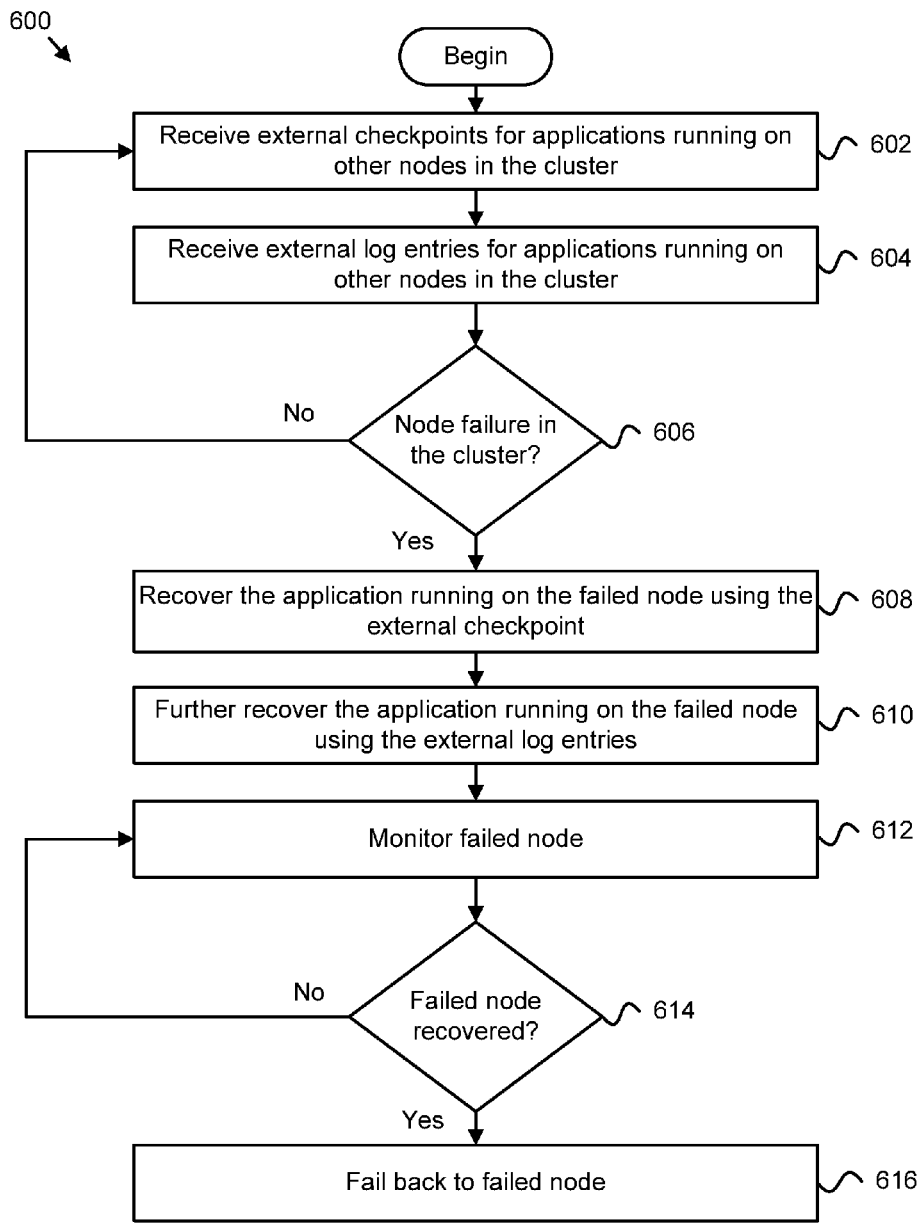
FIG. 6 is an illustrative flow chart diagram illustrating one embodiment of a method for recovering from a node failure in a loosely-coupled cluster.

FIG. 6 shows one embodiment of a method 600 for recovering from a node failure in a loosely-coupled cluster. The method 600 may start with receiving 602 external checkpoints 210 for applications 108 running on other nodes in the cluster. The recovery apparatus 110 may receive the external checkpoints 210. The method 600 may also involve receiving 604 external log entries for applications 108 running on other nodes in the cluster. The recovery apparatus 110 may receive the log entries 212 from the other nodes in the cluster.

In certain embodiments, each recovery apparatus 110 on each node broadcasts the checkpoints 210 and the log entries 212 to all other nodes in the cluster. In other embodiments, the recovery apparatus 110 may send the checkpoints 210 and the log entries 212 to only select nodes in the cluster. Similarly, the recovery apparatus 110 may receive external checkpoints 210 and external log entries 212 from only a subset of the nodes in the cluster.

The recovery apparatus 110 may receive multiple external checkpoints 210 and multiple log entries 212. The recovery apparatus 110 may be responsible for performing version maintenance operations for the external checkpoints 210 and the multiple log entries 212. In certain embodiments, the recovery apparatus 110 keeps only a most current checkpoint 210, and the log entries 212 that document changes occurring after the most current checkpoint.

The method 600 may also involve determining 606 whether there is a node failure in the cluster. If there is no node failure, the method may involve the recovery apparatus 110 continuing to receive external checkpoints 210 and external log entries 212.

The method 600 may involve, in response to a node failure, recovering 608 the application 108 running on the failed node using the external checkpoint 210 for the application 108. The method may also involve further recovering 610 the application 108 running on the failed node using the external log entries 212 for the application 108. The application 108 may be recovered on a node that is separate from the failed node, and be recovered using the external checkpoints 210 and the external log entries 212 received from the failed node.

The method 600 may also involve monitoring 612 the failed node and determining 614 whether the failed node is recovered. The method 600 may involve continuing the monitor the failed node until the failed node is recovered. The method 600 may further involve failing back 616 to the failed node in response to the failed node recovering.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product stored on a non-transitory computer-readable storage medium, the computer program product comprising instructions for:
   generating a checkpoint of application data that is in a consistent state on a first node in a loosely-coupled cluster comprising a plurality of nodes separate from the first node, wherein the application data is data of an application running on the first node;
   sending the checkpoint to a plurality of nodes of the loosely-couple cluster, the plurality of nodes comprising a plurality of failover nodes for the first node, wherein the checkpoint is sent directly from the first node to the plurality of failover nodes;

generating one or more log entries of changes in the application data between checkpoints of the application data;

sending the log entries directly to the plurality of failover nodes from the first node;

detecting a failure associated with the application running on the first node;

determining a failover node that comprises a most current checkpoint data for the application from among the plurality of failover nodes that contain checkpoint data for the application in response to detecting the failure on the first node; and recovering the application running on the first node on the determined failover node that comprises the most current checkpoint data for the application.

2. The computer program product of claim 1, further comprising receiving one or more external checkpoints for one or more second applications running on one or more of the plurality of nodes in the loosely-coupled cluster.

3. The computer program product of claim 1, further comprising receiving one or more external log entries for one or more second applications running on one or more of the plurality of nodes in the loosely-coupled cluster.

4. The computer program product of claim 1, further comprising monitoring for node failures on the plurality of nodes in the loosely-coupled cluster resulting in a failed node.

5. The computer program product of claim 4, further comprising determining that the first node is a failover node for the failed node.

6. The computer program product of claim 5, further comprising recovering, on the first node, one or more second applications on the failed node from an external checkpoint received by the first node.

7. The computer program product of claim 6, further comprising further recovering the one or more second applications on the failed node from external log entries received by the first node.

8. The computer program product of claim 1, further comprising creating one or more consistency groups that comprise a plurality of applications, and generating a checkpoint of consistency group data that is in consistent state for the plurality of applications in the consistency group.

9. The computer program product of claim 1, further comprising registering the application running on the first node with an event manager running on the first node.

10. A system comprising:
a first recovery apparatus running on a first node in a loosely-coupled cluster comprising a plurality of nodes separate from the first node, the second node plurality of nodes comprising a plurality of failover nodes for the first node, the first recovery apparatus:
generating a checkpoint of application data that is in a consistent state on the first node, wherein the application data is data of the first application;
generating one or more log entries of changes in the application data between checkpoints of the application data;
a first replicating service running on the first node, the first replicating service:
sending the checkpoint directly to the plurality of failover nodes from the first node for storage in local storage of the failover nodes;
sending the log entries directly to the plurality of failover nodes from the first node for storage in the local storage of the failover nodes; and a second recovery apparatus running on the second node in the loosely-coupled cluster, the second recovery apparatus:
monitoring for failure of the first node;
determining a second node that comprises a most current checkpoint data for the application from among the plurality of failover nodes that contain checkpoint data for the application in response to detecting a failure on the first node;
recovering, on the second node, the first application from the checkpoint sent to the second node; and
further recovering, on the second node, the first application from the log entries sent to the second node.

11. The system of claim 10, wherein the second recovery apparatus is further configured to failback the first application to the first node in response to the first node recovering from the failure.

12. The system of claim 10, wherein the first node is a first computer and the second node is a second computer separate from the first computer and connected to the first computer by a local area network connection.

13. The system of claim 10, wherein the first recovery apparatus and the second recovery apparatus are registered to the loosely-coupled cluster.

14. A computer-implemented method comprising:
generating a checkpoint of application data that is in a consistent state on a first node in a loosely-coupled cluster comprising a plurality of nodes separate from the first node, wherein the application data is data of an application running on the first node;
sending the checkpoint to a plurality of nodes of the loosely-couple cluster, the plurality of nodes comprising a plurality of failover nodes for the first node, wherein the checkpoint is sent directly from the first node to the plurality of failover nodes, the checkpoint being saved in local storage of the failover nodes;
generating one or more log entries of changes in the application data between checkpoints of the application data;
sending the log entries directly to the plurality of failover nodes from the first node, wherein the log entries are saved in local storage of the failover nodes;
detecting a failure associated with the application running on the first node;
determining a failover node that comprises a most current checkpoint data for the application from among the plurality of failover nodes that contain checkpoint data for the application in response to detecting the failure on the first node; and
recovering the application running on the first node on the determined failover node that comprises the most current checkpoint data for the application.

15. The method of claim 14, further comprising generating a second checkpoint of the application data that is in a consistent state on the first node.

16. The method of claim 15, further comprising deleting the log entries in response the second checkpoint being generated.

17. The method of claim 14, further comprising receiving one or more external checkpoints for one or more second applications running on one or more of the plurality of nodes in the loosely-coupled cluster.

18. The method of claim 17, further comprising receiving one or more shared log entries for the one or more second applications running on the one or more of the plurality of nodes in the loosely-coupled cluster.

19. The method of claim 18, further comprising determining that the first node is a failover node for a failed node.

20. The method of claim 19, further comprising recovering, on the first node, one or more second applications on the failed node from the shared checkpoint and the one or more external log entries.

\* \* \* \* \*